Dec. 6, 1932.  E. SCHMIDT  1,890,418
HEAT INSULATION
Filed Sept. 28, 1932  2 Sheets-Sheet 2
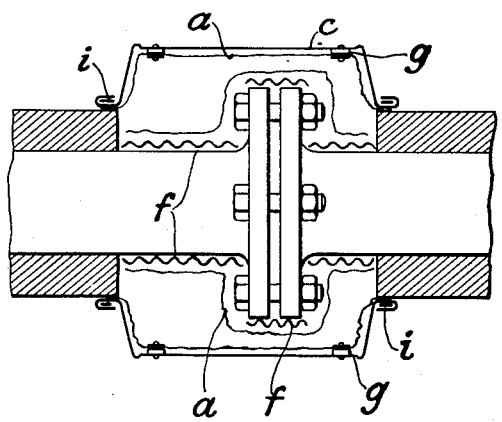
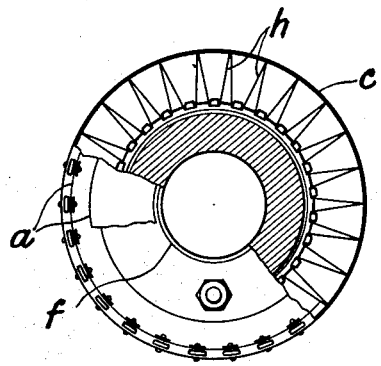
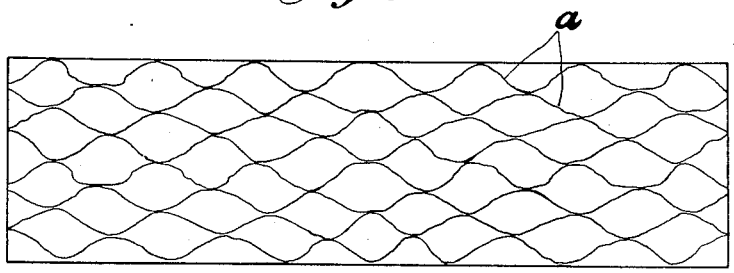
INVENTOR
Ernst Schmidt
BY Prindle, Bean & Mann
ATTORNEYS Patented Dec. 6, 1932

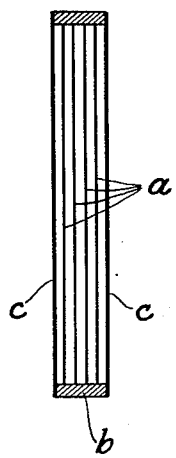
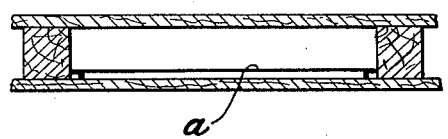
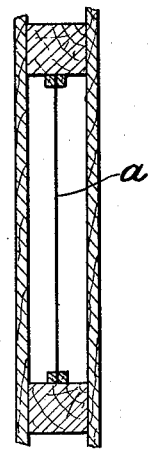
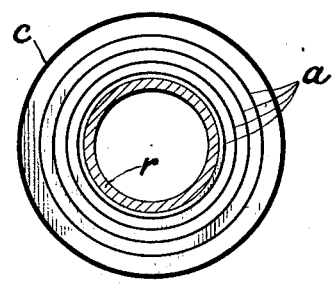
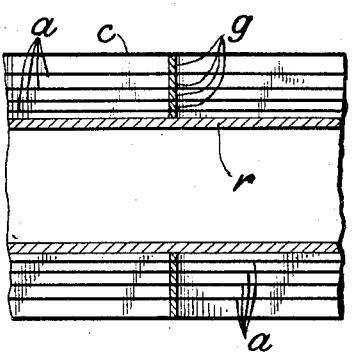
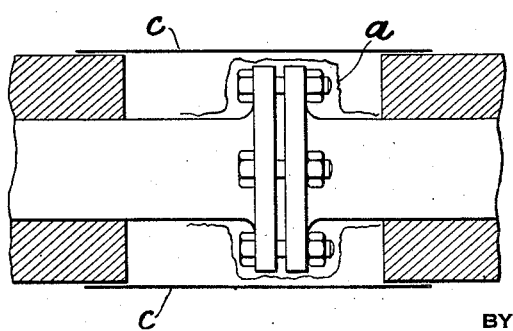

1,890,418

UNITED STATES PATENT OFFICE

ERNST SCHMIDT, OF DANZIG, FREE CITY OF DANZIG

HEAT INSULATION

Application filed September 28, 1932, Serial No. 635,263, and in Germany July 4, 1925.

This application is a continuation in part of application Ser. No. 105,753, filed Apr. 30, 1926, which was originally filed as a joint application of myself together with Edward Dyckerhoff.

This invention covered by this case relates to a heat insulation structure and has for its object the production of a structure of exceedingly light weight at low cost which is particularly efficient to prevent heat losses by radiation as well as by conduction and convection.

Broadly speaking, the invention herein claimed consists in a structure in which very thin readily flexible metal foil is supported, preferably with both faces exposed or with a large proportion of both faces exposed, to air spaces which are thick enough to afford a substantial insulation against transfer of heat by conduction but are thin enough so that there will be relatively little convection. In the types of insulation used prior to the present invention, air spaces have ordinarily been separated by walls of material such as paper-felt, asbestos and the like. With materials of this type if any reasonable degree of efficiency of insulation is to be obtained in a given space, it is necessary to use a very large number of separators, for these separators have a very high factor of emissivity and therefore each one cuts down only a small amount of the heat transmitted by radiation. Bright metal surfaces, on the other hand, radiate but little heat, and the exchange of heat by radiation being consequently so decreased that only a small amount is transmitted, I have discovered that it is possible to employ much thicker layers of air without subdividing them; and by subdividing the air spaces only to a small extent, layers possessing great insulating properties are obtained. That is, the full benefit of the low conductivity of the air is utilized. Transference of heat by convection currents in such layers of air, contrary to the general opinion held prior to my invention, only increases slightly with the thickness of the layers. Thus great efficiency is obtained by the use of thick air layers which are now known to be available because of my discovery that the chief danger of not using many separators to subdivide these layers arises from radiation and not from convection and this danger can be overcome by the use of bright metal. Metal available for this purpose, however, is itself a good conductor and if used in the form of sheets of structural thickness would not only be expensive and difficult to maintain in position but would also conduct so much heat to the supports that the efficiency would be greatly impaired. This difficulty is overcome by my discovery that it is feasible to use extended sheets of very thin foil supported at spaced intervals so that the greater portion of both faces is exposed. In order to obtain greater insulating properties several layers of air limited by metal foil may be arranged one alongside of the other.

Thin aluminum foil is especially suitable for the purposes of the invention, but foil made of any suitable metal may be employed provided that it remains bright and possesses a low radiation constant. Particular advantages attaching to the employment of thin foil for the purposes of the invention include the following:

In the event of expansion and contraction by heating and cooling the thin metal foil flexes and is distortable without tending to displace its supports.

In spite of the high conductivity of the metal from which the foil is made, little heat flows lengthwise along the foil. A sheet of thin metal foil therefore only conducts a small amount of heat from or to its supports, even at high temperatures.

Owing to the great thinness of the sheets and the feasibility of spacing them relatively far apart, as has already been pointed out, only a very small amount of metal need be employed so that the structure is very light, being less than 1/10 to 1/20 of insulation devices usually employed. This means that the structures can be produced very cheaply and will have a very low heat capacity. Of course, very light weight is of great advantage structurally and is of great importance for many uses, particularly in transportation.

One advantage of spacing the sheets relatively far apart is that no capillary action takes place and the structure will not absorb water. Further, the structure can readily be produced in non-combustible form.

As regards the thickness of the metal used, it should, as stated, be readily flexible so that it may be shaped by hand and readily made into rolls for shipment. In general, the maximum thickness of aluminum foil will be not over .05 mm. For many purposes, a foil of between .05 mm. and .02 mm. may be employed but I may, if desired, use foil as thin as .005 mm., or thinner if it is available. The very thinnest foil will ordinarily be used in the crumpled form hereinafter described but thin tissue-paper-like sheets of foil may be used in various ways, and by supporting the thin sheets it is possible to arrange them in other manners than as loosely contacting layers where this is desirable. In other words, the very thinnest foil available, while ordinarily used in the crumpled form, may also if desired be used in the form of flat sheets held in supports, or in any other desired form which circumstances may call for.

The thickness of the air spaces may vary substantially, but in a flat panel (such as is more specifically described in connection with Fig. 1) if the layers of foil are spaced about 1 cm. apart, an effect is had, which for a given total thickness, is equivalent to the best cork and peat products. This dimension is not given as an absolute measure but indicates the order of size of spacing that may be used with this invention, and as is more specifically brought out in connection with Fig. 4, a substantial variation is permissible. However, it will be noted that with the spacing of 1 cm., if even the maximum thickness of foil stated is employed, the total thickness of the metal sheets will not be over 1/200 of the total space available for separators and air.

Inasmuch as my invention broadly involves using very thin aluminum foil at an average spacing such as will produce great lightness in the finished structure, and with the faces exposed to reduce radiation, it is essential that some means be supplied for supporting the foil, but for this purpose many different devices may be employed; for example, the foil may be held extended substantially flat in frame-like structures, or may be wrapped in concentric layers around curved objects with spacers interposed between the sheets of foil, or corrugated material of an insulating type such as asbestos may be employed. If loose filling material is put between the sheets it will tend to keep the sheets apart but only small amounts of such material should be employed as it is desirable that as much as possible of both faces of the sheets should be left exposed.

My invention can readily be understood from the accompanying drawings which show various illustrative examples thereof. In these drawings, Fig. 1 is a sectional view of a panel in which the foil is held extended in a frame with the sheets substantially flat; Fig. 2 illustrates a ceiling or floor provided with an air space in which my invention is employed; Fig. 3 is a similar section of a wall with the foil somewhat differently arranged; Figs. 4 and 5 are respectively transverse and longitudinal sections showing the use of my invention as applied to a pipe, and illustrating a particular arrangement recommended for high temperatures; Fig. 6 is a sectional view showing the way in which the foil may be applied to a pipe coupling; Fig. 7 is a view similar to Fig. 6 showing a modified construction; Fig. 8 is a transverse section of the parts shown in Fig. 7, and Fig. 9 illustrates a further manner in which my invention may be employed and likewise embodying a further invention which I believe was made by Eduard Dyckerhoff and which I am informed is the subject of a separate application for patent made by him, likewise as a divisional of said application Ser. No. 105,753.

In all of the figures, $a$ is intended to designate a sheet of very thin metal foil such as aluminum. For example, in Fig. 1 the flat parallel sheets $a$ are held extended in the frame $b$ and an outside protective casing is formed from the two thicker plates $c$ of any suitable material. In Fig. 2 it will be noted that the foil layer $a$ is held extended within the structural framework, being quite close to one face thereof. The structure of Fig. 3 is similar except that in this case the foil is positioned approximately half way between the two faces of the structure.

Figs. 4 and 5 illustrate an application of my invention to pipes. Here the foil $a$ is arranged as a plurality of substantially concentric layers held spaced from the pipe and from each other in any desired way as by the spacers $g$. The letter $c$ indicates, as before, a protective casing of any desired material.

The distances apart of the metal sheets are preferably arranged to be less for high temperatures than for low temperatures, as radiation increases with the temperature. Thus in the case of a steep temperature gradient in the insulation, the layers of air adjacent portions at a relatively high temperature may be relatively narrow and those adjacent portions at a relatively low temperature may be made relatively wide, so that in the case of a steam pipe insulation, for example, the distance apart of the separate sheets of foil increases in an outward direction. This feature is illustrated in this figure and it may be noted that there is a very substantial variation between the minimum spacing shown and the maximum spacing.

Fig. 6 shows an example of a way in which irregular bodies may be insulated. In this case a pipe coupling is used as an example. Here the coupling is shown as covered with a thin sheet of foil a which may be wrapped by hand around the coupling. An outer sheet c serves as a protection and preferably is made of a metal having a low emissivity constant. If desired, a sheet of foil may be used in place of the member c, and a separate casing employed.

In the embodiment illustrated in Figs. 7 and 8, bright metal sheets of foil, preferably of aluminum, are arranged at predetermined distances from each other between the flanges and outer protective casing c. In order to prevent direct contact of the sheets a on the one hand with the flange or pipe and on the other hand with the protective casing c, material of low conductivity, such for example as corrugated asbestos board f is employed washers g of asbestos board, or the like, being mounted on the inner surface of the casing c.

In order to facilitate the bending of the casing c acute-angled incisions h are made therein as shown in Fig. 8 and flat strips or bands i are provided for the purpose of supporting the edges of the casing. For the purpose of simplicity and rapidity in application and cheapness, insulation should be capable of being readily wound off and on and secured when so required.

The material from which the insulating layers f and g are made may be varied as desired, any material which is a poor conductor of heat being suitable for this purpose, while on the other hand, the parts a must consist of very thin non-resilient bright material preferably aluminum foil.

A further example of the way in which foil may be employed within my invention (though the same is not specifically claimed by me herein) is particularly useful for filling up hollow spaces. This is illustrated in Fig. 9 where the hollow space is filled up with very thin crumpled metal sheets a which, as will be seen, are so arranged that considerable air spaces are provided between them. If desired, this filling may be used between flat sheets of foil.

The insulating material of my invention may be applied in many ways. It may be employed as stated for filling hollow spaces, or for an insulating surface, an outer casing or wall being provided for the purpose of protecting the insulating material. For example, plates, casings or panels comprising especially formed hollow spaces may be manufactured, filled with the new insulating material and employed for covering surfaces requiring insulation. The subject-matter of the invention may evidently be applied for heat insulation purposes in any case where protection against loss or interchange of heat has to be protected against.

What I claim is:

1. An insulating structure comprising a casing, a plurality of substantially confined layers of gas in the casing, such layers being in the order of about a centimeter thick on the average so as to provide a substantial insulation against the transfer of heat by conduction but thin enough to prevent the extensive formation of convection currents, and very thin, readily flexible sheets having metal surfaces exposed on both sides adapted largely to prevent the transfer of heat by radiation separating such layers and held positioned in such casing against substantial movement.

2. A structure as defined in claim 1, in which the very thin, readily flexible sheets used to separate said layers are thin aluminum foil.

3. In combination, a frame of relatively low conductivity and a plurality of thin, readily flexible sheets having heat reflecting metal faces exposed on both sides held extended in said frame by marginal portions and at an average spacing of about 1 centimeter.

4. In combination a casing and a plurality of sheets of heat-reflective foil of conductive metal less than .05 millimeters thick supported in said casing at an average spacing of about 1 centimeter so as to form a plurality of substantially enclosed spaces within the casing.

5. An insulating panel comprising a frame of relatively low conductivity, a confined body of gas in the frame and very thin metal foil held substantially flat in the frame with a very large proportion of both faces exposed, subdividing such body of gas into a plurality of layers of substantial thickness.

6. In combination, a protective casing having a space therein, a plurality of sheets of very thin heat-reflecting foil of conductive metal aggregating a total thickness not over 1/200 of the thickness of such space subdividing such space into zones of substantial thickness, and means contacting with each such sheet at a plurality of spaced intervals for supporting such sheets so that the sheets are held in position in the casing with a very large proportion of both faces of each such sheet exposed, whereby transmission of heat by radiation is largely prevented without causing undue transmission of heat by conduction.

7. A structure as defined in claim 6 in which the foil used is very thin aluminum foil and does not aggregate a total thickness more than 1/500 of such space as therein specified.

E. SCHMIDT.